US011599078B2

(12) United States Patent
Sterjo et al.

(10) Patent No.: US 11,599,078 B2
(45) Date of Patent: Mar. 7, 2023

(54) SELF-CALIBRATING UNIVERSAL INPUT PORT

(71) Applicant: Johnson Controls Technology Company, Auburn Hills, MI (US)

(72) Inventors: Denis Sterjo, Cudahy, WI (US); Mark G. Freund, Wauwatosa, WI (US); Michael J. Schantzen, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 631 days.

(21) Appl. No.: 16/539,367

(22) Filed: Aug. 13, 2019

(65) Prior Publication Data

US 2021/0048788 A1   Feb. 18, 2021

(51) Int. Cl.
*G05B 19/042*   (2006.01)
*H02M 7/217*    (2006.01)
*H04L 12/10*    (2006.01)

(52) U.S. Cl.
CPC ........ *G05B 19/0423* (2013.01); *H02M 7/217* (2013.01); *H04L 12/10* (2013.01); *G05B 2219/21117* (2013.01)

(58) Field of Classification Search
CPC ..... G05B 19/0423; G05B 2219/21117; H02M 7/217; H04L 12/10
See application file for complete search history.

(56) References Cited

U.S. PATENT DOCUMENTS

| 4,417,151 | A  |   | 11/1983 | Klein et al. |              |
|-----------|----|---|---------|--------------|--------------|
| 5,500,644 | A  | * | 3/1996  | Denjean      | H03M 1/1052  |
|           |    |   |         |              | 341/120      |
| 6,124,820 | A  | * | 9/2000  | Norman       | H03M 1/069   |
|           |    |   |         |              | 341/161      |
| 6,486,807 | B2 | * | 11/2002 | Jonsson      | H03M 1/1057  |
|           |    |   |         |              | 341/120      |

(Continued)

OTHER PUBLICATIONS

Analog Devices, Quad channel, Flexible Instrumentation Interface Circuit, AD74412R Preliminary Technical Data, Dec. 2017, 58 pages, Analog Devices, Inc.

(Continued)

*Primary Examiner* — Gary Collins
(74) *Attorney, Agent, or Firm* — Foley & Lardner LLP

(57) ABSTRACT

An illustrative embodiment disclosed herein is a circuit for sensing heating, ventilation, air conditioning, and refrigeration (HVACR) equipment. The circuit includes an input port that has an input voltage signal. The circuit includes an analog-to-digital converter (ADC) generating a first digital signal based on receiving a representation of a supply voltage, generating a second digital signal based on receiving the divided input voltage signal, and outputting the first digital signal, the second digital signal, and an output voltage reference. The circuit includes an amplifier coupled to the ADC and amplifying the output voltage reference to generate a supply voltage. The circuit includes a microprocessor coupled to the ADC and configured to calculate a first ratio of the first digital signal and the supply voltage. The microprocessor is configured to determine the input voltage signal by calculating a second ratio of the second digital signal and the first ratio.

20 Claims, 6 Drawing Sheets

(56) References Cited

U.S. PATENT DOCUMENTS

| | | | |
|---|---|---|---|
| 7,046,179 B1* | 5/2006 | Taft | H03M 1/1009 |
| | | | 341/120 |
| 7,414,553 B1* | 8/2008 | Tsyrganovich | H03M 1/1028 |
| | | | 341/120 |
| 8,390,324 B2 | 3/2013 | Fletcher et al. | |
| 10,090,848 B1* | 10/2018 | Farid | H03M 1/464 |
| 2005/0137802 A1* | 6/2005 | Maloberti | H03M 1/1004 |
| | | | 702/1 |
| 2010/0253559 A1* | 10/2010 | Dasnurkar | H03K 4/501 |
| | | | 341/121 |
| 2012/0218022 A1* | 8/2012 | Lazarov | G01R 19/00 |
| | | | 327/362 |
| 2012/0293349 A1* | 11/2012 | Chen | H03M 1/1023 |
| | | | 341/120 |
| 2013/0158904 A1* | 6/2013 | Fabregas | G01R 35/005 |
| | | | 702/58 |
| 2013/0162341 A1* | 6/2013 | Temkine | G05F 3/30 |
| | | | 327/539 |
| 2014/0002285 A1* | 1/2014 | Cho | H03M 1/1009 |
| | | | 341/120 |
| 2016/0134302 A1* | 5/2016 | Schafferer | H03M 1/066 |
| | | | 341/120 |
| 2016/0231757 A1* | 8/2016 | Lim | G01R 19/10 |
| 2018/0139062 A1 | 5/2018 | Alley et al. | |

OTHER PUBLICATIONS

ControlEdge PLC Specification, CE03-100-140.1_V1.1, Sep. 2017, 28 pages, Version 1.1, Honeywell International Inc.

\* cited by examiner

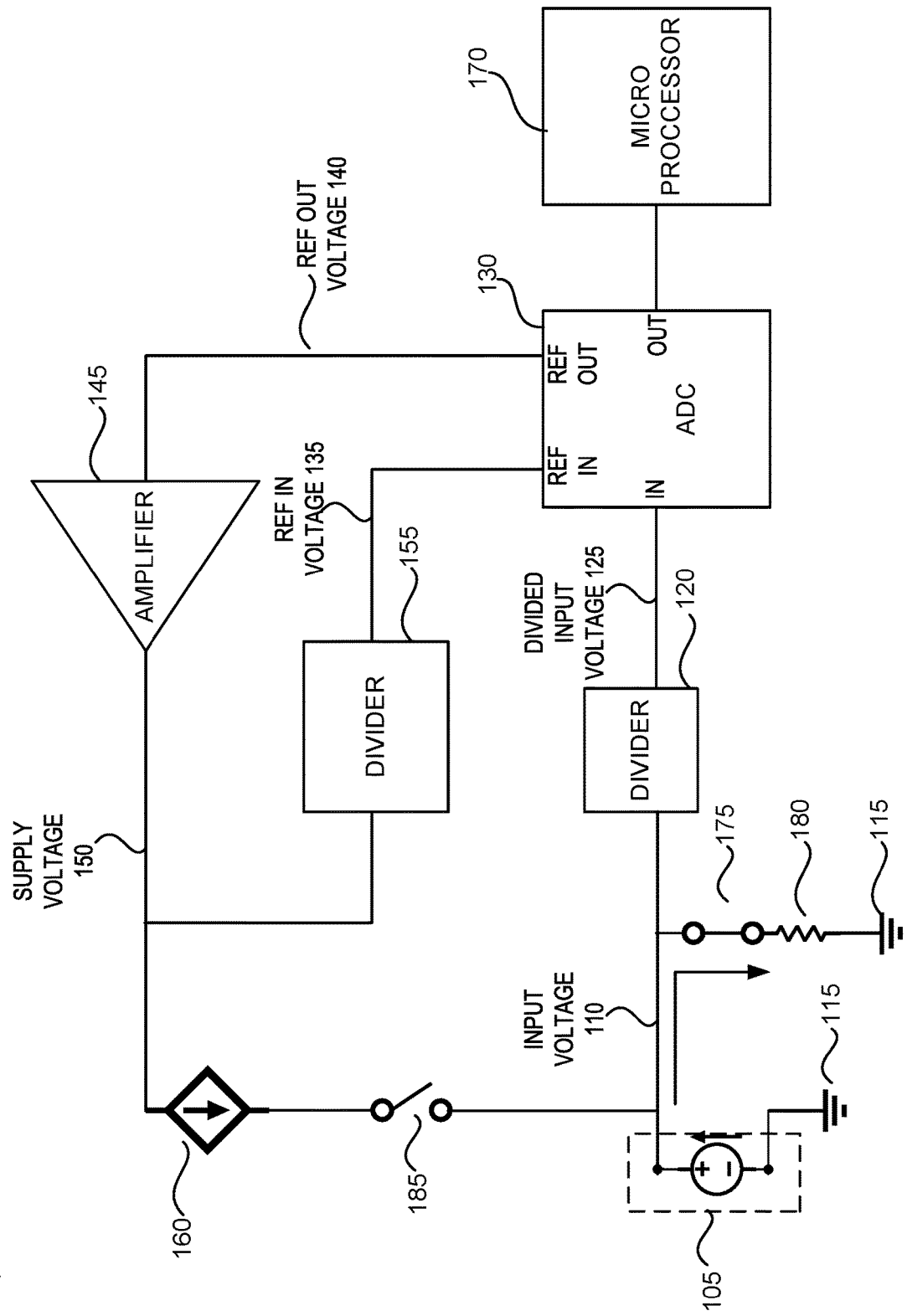

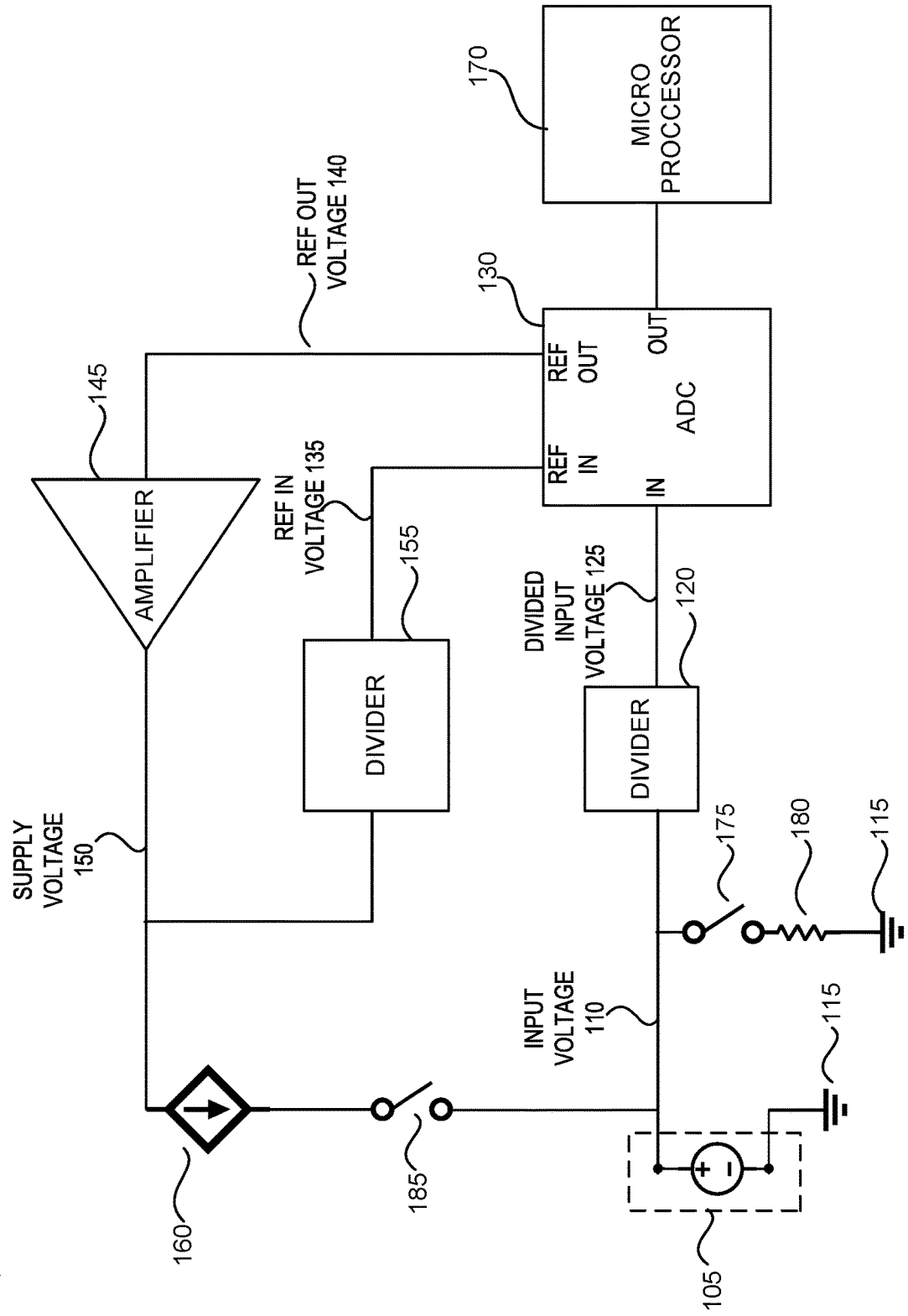

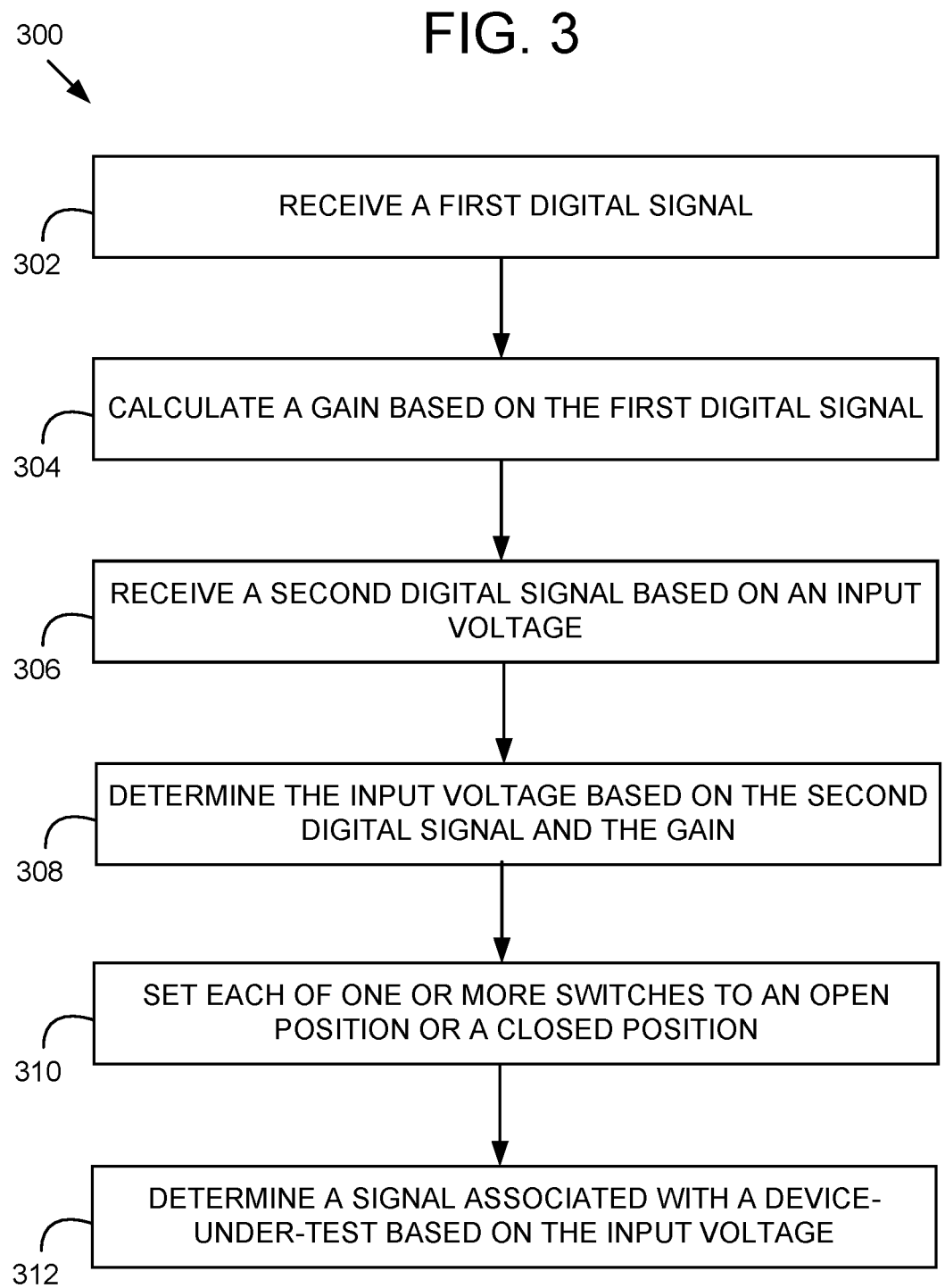

SELF-CALIBRATING UNIVERSAL INPUT PORT

BACKGROUND

The present disclosure relates generally to heating, ventilation, air conditioning, and refrigeration (HVACR) systems and more particularly to a self-calibrating input circuit on HVACR controllers.

HVACR systems can be found in a wide variety of settings, including grocery stores, hotels, restaurants, office buildings, cafeterias, and other types of buildings or structures. In these HVACR systems, there are many parameters to be controlled. Generally, these parameters are controlled using one or more controllers that are programmed at their respective site to satisfy the demands of the particular application in which the HVACR system is used.

SUMMARY

An illustrative embodiment disclosed herein is a circuit for sensing heating, ventilation, air conditioning, and refrigeration (HVACR) equipment. The circuit includes an input port that, upon receiving a device-under-test (DUT), has an input voltage signal. The circuit includes a first switch coupled to the input port and a resistive load having a load resistance and having a first open position and a first closed position. The circuit includes an input divider coupled to the input port and dividing the input voltage signal. The circuit includes an analog-to-digital converter (ADC) coupled to the input divider, generating a first digital signal based on receiving an input voltage reference, generating a second digital signal based on receiving the divided input voltage signal, and outputting the first digital signal, the second digital signal, and an output voltage reference. The circuit includes an amplifier coupled to the ADC and amplifying the output voltage reference to generate a supply voltage. The circuit includes a supply divider coupled to the amplifier and dividing the supply voltage to generate the input voltage reference. The circuit includes a voltage-controlled current source coupled to the amplifier and converting the supply voltage to a first current configured to drive the input port. The circuit includes a second switch coupled to the voltage-controlled source and the input port and having a second open position and a second closed position. The circuit includes a microprocessor coupled to the ADC. The microprocessor is configured to calculate a first ratio of the first digital signal and the supply voltage. The microprocessor is configured to determine the input voltage signal by calculating a second ratio of the second digital signal and the first ratio.

In some embodiments, the microprocessor is further configured to set the first switch to the first open position, set the second switch to the second closed position, and determine a resistance of the DUT by calculating a third ratio of the second ratio and the first current.

In some embodiments, the microprocessor is further configured to set the first switch to the first closed position, set the second switch in to the second open position, and determine a current of the DUT by calculating a third ratio of the second ratio and the load resistance.

In some embodiments, the microprocessor is further configured to set the first switch to the first open position, set the second switch to the second open position, and determine a voltage of the DUT as the input voltage signal.

In some embodiments, the microprocessor is further configured to periodically calculate the first ratio at a predetermined interval.

In some embodiments, the amplifier includes an operation amplifier having a first input, a second opamp input and an opamp output, a first resistor coupled between the first opamp input and the opamp output, and a second resistor between the first opamp input and ground.

In some embodiments, the input divider includes a first resistive element coupled to the input port and the ADC and having a first resistance and a second resistive element coupled to the ADC and ground and having a second resistance.

In some embodiments, the supply divider includes a third resistive element coupled to the amplifier and the ADC and having a third resistance and a fourth resistive element coupled to the ADC and the ground and having a fourth resistance.

In some embodiments, a third ratio of the first resistance and the second resistance is same or substantially similar to a fourth ratio of the third resistance and the fourth resistance.

In some embodiments, the voltage-controlled current source includes a first resistive element coupled to the amplifier and the second switch and having a first resistance.

Another illustrative embodiment disclosed herein is a system for sensing heating, ventilation, air conditioning, and refrigeration (HVACR) equipment. The system includes a controller configured to control HVACR equipment and a circuit coupled to the controller. The circuit includes an input port that, upon receiving a device-under-test (DUT), has an input voltage signal. The circuit includes a first switch coupled to the input port and a resistive load having a load resistance and having a first open position and a first closed position. The circuit includes an input divider coupled to the input port and dividing the input voltage signal. The circuit includes an analog-to-digital converter (ADC) coupled to the input divider, generating a first digital signal based on receiving an input voltage reference, generating a second digital signal based on receiving the divided input voltage signal, and outputting the first digital signal, the second digital signal, and an output voltage reference. The circuit includes an amplifier coupled to the ADC and amplifying the output voltage reference to generate a supply voltage. The circuit includes a supply divider coupled to the amplifier and dividing the supply voltage to generate the input voltage reference. The circuit includes a voltage-controlled current source coupled to the amplifier and converting the supply voltage to a first current configured to drive the input port. The circuit includes a second switch coupled to the voltage-controlled source and the input port and having a second open position and a second closed position. The circuit includes a microprocessor coupled to the ADC. The microprocessor is configured to calculate a first ratio of the first digital signal and the supply voltage. The microprocessor is configured to determine the input voltage signal by calculating a second ratio of the second digital signal and the first ratio.

In some embodiments, the microprocessor is further configured to set the first switch to the first open position, set the second switch to the second closed position, and determine a resistance of the DUT by calculating a third ratio of the second ratio and the first current.

In some embodiments, the microprocessor is further configured to set the first switch to the first closed position, set the second switch in to the second open position, and determine a current of the DUT by calculating a third ratio of the second ratio and the load resistance.

In some embodiments, the microprocessor is further configured to set the first switch to the first open position, set the second switch to the second open position, and determine a voltage of the DUT as the input voltage signal.

In some embodiments, the microprocessor is further configured to periodically calculate the first ratio at a predetermined interval.

Another illustrative embodiment disclosed herein is a method for sensing heating, ventilation, air conditioning, and refrigeration (HVACR) equipment. The method includes receiving, by a microprocessor, a first digital signal converted from a first voltage-divided representation of a supply voltage, calculating, by the microprocessor, a first ratio of the first digital signal and the supply voltage, receiving, by the microprocessor, a second digital signal converted from a second voltage-divided representation of an input voltage signal corresponding to a device-under-test (DUT) coupled to an input port, determining, by the microprocessor, the input voltage signal by calculating a second ratio of the second digital signal and the first ratio, setting, by the microprocessor, a first switch coupled to the input port and a resistive load to a first open position or a first closed position, setting, by the microprocessor, a second switch coupled to the input port and a voltage-controlled current source to a second open position or a second closed position, and determining, by the microprocessor, a resistance, a voltage, or a current of the DUT based on the first switch and the second switch.

In some embodiments, the method further includes setting, by the microprocessor, the first switch to the first open position, setting, by the microprocessor, the second switch to the second closed position, and determining, by the microprocessor, the resistance of the DUT by calculating a third ratio of the second ratio and a first current of the voltage-controlled current source.

In some embodiments, the method further includes setting, by the microprocessor, the first switch to the first closed position, setting, by the microprocessor, the second switch to the second open position, and determining, by the microprocessor, the current of the DUT by calculating a third ratio of the second ratio and a load resistance of the resistive load.

In some embodiments, the method further includes setting, by the microprocessor, the first switch to the first open position, setting, by the microprocessor, the second switch to the second open position, and determining, by the microprocessor, the voltage of the DUT as the input voltage signal.

In some embodiments, the method further includes periodically calculating, by the microprocessor, the first ratio at a predetermined interval.

BRIEF DESCRIPTION OF THE DRAWINGS

FIG. 1C is an example block diagram of a reconfigurable input circuit, according to an exemplary embodiment.

FIG. 1D is an example block diagram of a reconfigurable input circuit, according to an exemplary embodiment.

FIG. 3 is a flow chart of a process for sensing HVACR equipment, according to an exemplary embodiment.

DETAILED DESCRIPTION

Figure 1A:
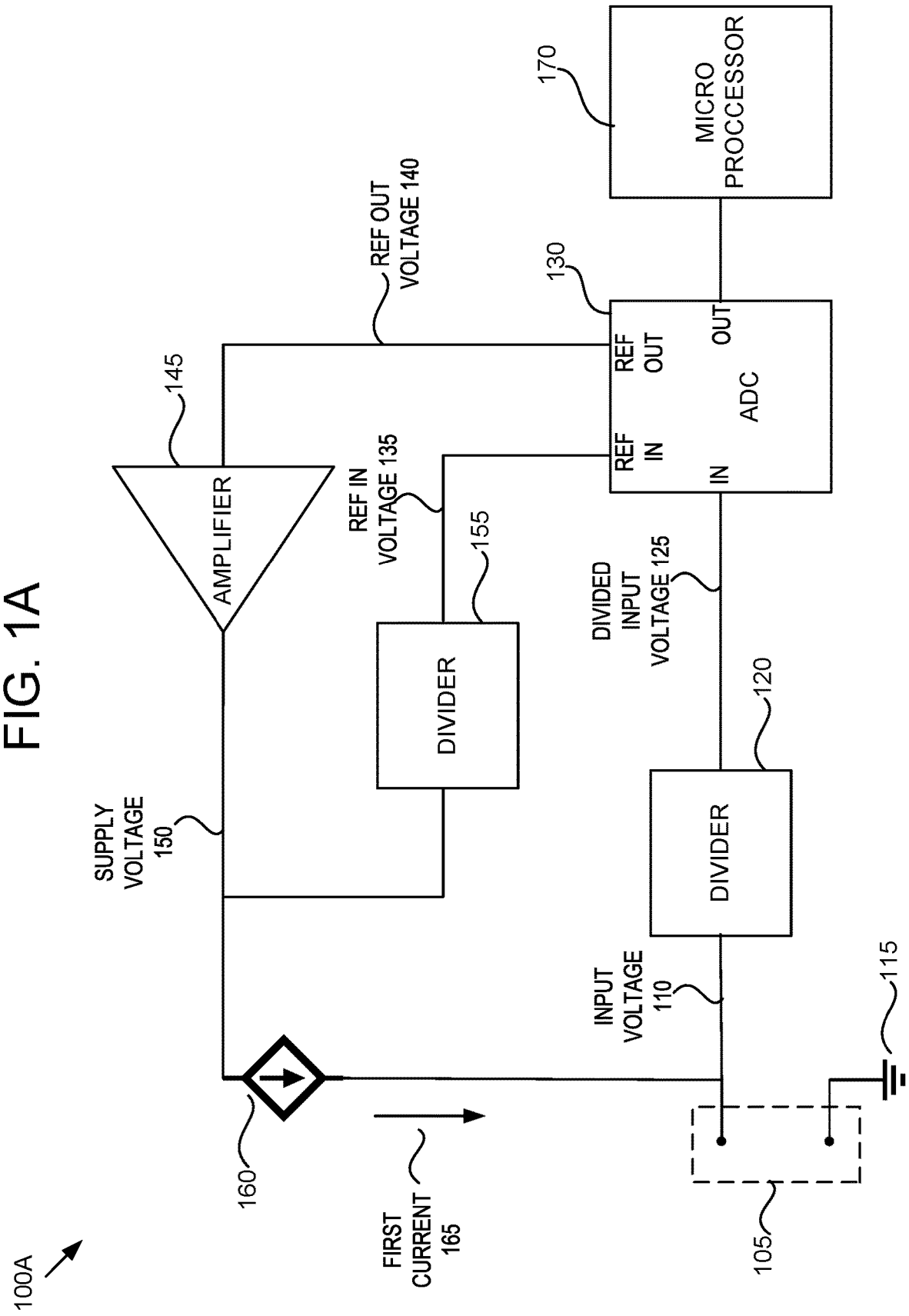
FIG. 1A is an example block diagram of an input circuit, according to an exemplary embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The standard input circuit on HVACR controllers requires calibration at the factory. The calibration requires having precision equipment at the factory, calibrating the test equipment periodically, and executing a series of algorithms in firmware. Another issue with calibration is the standard calibration is a one-time process done at room temperature. The standard input measurements can drift over time, temperature and changes in the supply voltage.

Disclosed herein is a system and method for a universal, self-calibrating input port for an HVACR controller. In some embodiments, the system includes an analog-to-digital converter (ADC) that converts a representation of a signal associated with a device-under-test into a digital signal. In some embodiments, the system includes a microprocessor that measures an internal gain based on a stable reference and uses the internal gain to back-calculate the signal associated with the device-under-test.

In some embodiments of the present disclosure, the input circuit operates in three modes (voltage, current, and resistance) and is designed such that it does not require external calibration for performing analog input and digital input measurements. In some embodiments, the circuit can periodically perform self-calibration of the gain value by use of the stable, high accuracy reference. Therefore, any fluctuations in temperate or supply voltage are accounted for and the measurements are as accurate as possible, in some embodiments. In some embodiments, the self-calibration can be performed while units are installed and working at a customer site and the self-calibration does not interfere with the measurements.

In some embodiments, the system tracks a supply voltage. Therefore, any drift of the supply voltage has no effect on the on signal measurements, in some embodiments. In some embodiments, the supply voltage tracking is ratio-metric to the ADC reference voltage, eliminating variations on resistance temperature detector (RTD) readings. In some embodiments, the system utilizes an internal ADC reference to source current for resistance measurements. In some embodiments, any drift to the reference voltage are calibrated out and the measurements will maintain their accuracy. In some embodiments, the use of a ladder resistor pair in a gain stage ensures the correct gain value in every circuit, eliminating another element that does not need calibration.

In some embodiments, the system couples to an HVACR controller. The system reads an input from a device-under-test and sends a digital representation of the input to the HVACR controller, in some embodiments. The HVACR controller can be configured to receive setpoints (e.g. temperature setpoints or humidity setpoints) via a user interface. The HVACR controller can be configured to control HVACR equipment. The HVACR controller can be configured to provide control signals to HVACR equipment. In some embodiments, providing the control signals cause the HVACR equipment to cool and/or heat a zone and/or building to a setpoint temperature.

Now referring to FIG. 1A an example block diagram of an input circuit 100A is shown. Additional, fewer, or different components may be included in the input circuit 100A, depending on the embodiment. In some embodiments, the input circuit 100A is a stand-alone circuit.

The input circuit 100A includes an input port 105 having two terminals. In some embodiments, the input port 105 is coupled to a device-under-test (DUT). Upon coupling the DUT to the input port 105, an input voltage signal 110 is at a first terminal of the input port 105. In some embodiments, the second terminal of the input port 105 is coupled to ground 115.

Figure 2B:
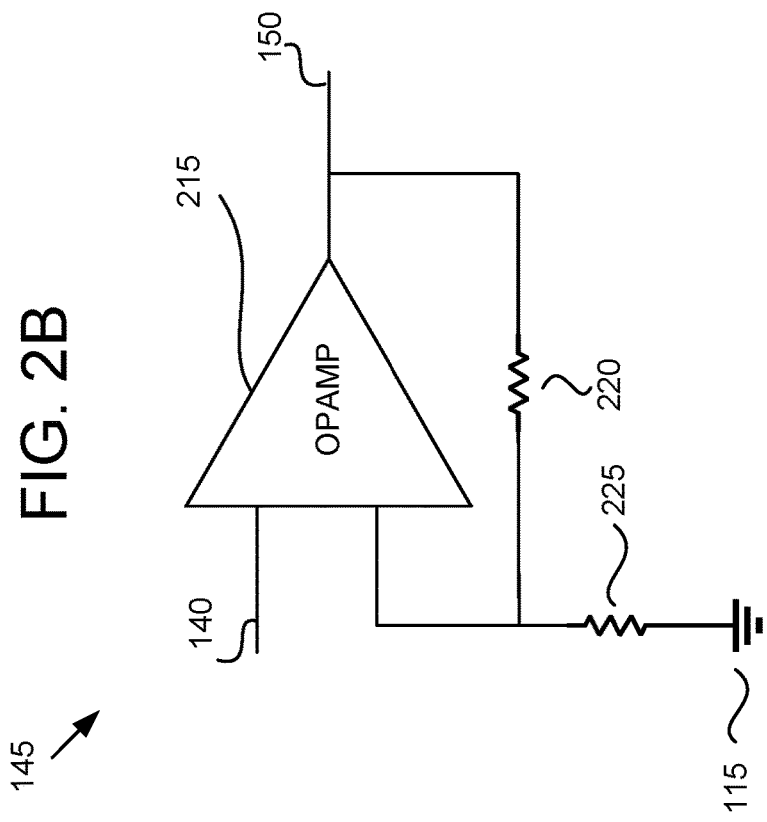
FIG. 2B is an example block diagram of an amplifier, according to an exemplary embodiment.
Figure 2A:
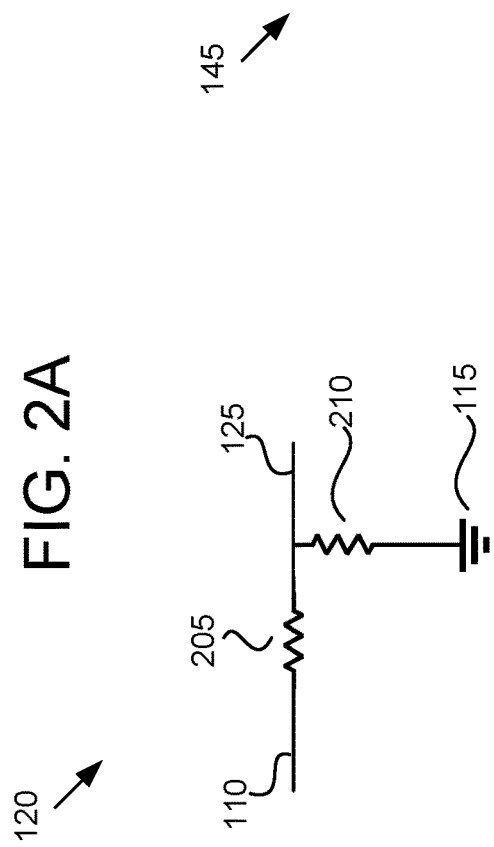
FIG. 2A is an example block diagram of a divider, according to an exemplary embodiment.

The input circuit 100A includes a divider 120 coupled to the input port 105. The divider 120 is referred to herein as "an input divider 120." The input divider 120 is configured to divide-down the input voltage signal 110 to a divided input voltage signal 125 (referred to herein as "divided input voltage 125"). Referring now to FIG. 2A, one embodiment of the input divider 120 includes a resistive element 205, with a resistance R1, coupled to the input port 105 and an analog-to-digital converter (ADC) 130. The input divider 120 includes a resistive element 205, with a resistance R2, coupled to the ADC 130 and the ground 115. The relationship between the input voltage signal 110, V1, and the divided input voltage 125, V2 is:

$$V_2 = V_1 * \frac{R_2}{R_1 + R_2}$$

In some embodiments, the input divider 120 includes two capacitive elements such that the divided-down voltage is based on a relationship of the two capacitive elements. In some embodiments, the input divider 120 includes two inductive elements such that the divided-down voltage is based on a relationship of the two inductive elements.

Referring back to FIG. 1A, the input circuit 100A includes the ADC 130 coupled to the input divider 120. The ADC 130 is configured to convert analog signals to digital signals. The ADC 130 receives the divided input voltage 125 at a first ADC input. The ADC 130 converts the divided input voltage 125 to a first digital signal. The ADC 130 receives an input reference voltage 135 (e.g. ref in voltage 135) at a second input. The ADC 130 converts the input reference voltage 135 to a second digital signal. Each digital signal may be represented as a base-2 (e.g. binary) number, a base-10 number, or a hexadecimal number, among others. Each digital signal may be encoded as one or more pulses, one or more amplitudes, one or more frequencies, or one or more phases, among others. The ADC 130 may output each digital signal. The ADC 130 may generate and output an output reference voltage 140 (e.g. ref out voltage 140).

The input circuit 100A includes the amplifier 145 coupled to the ADC 130. The amplifier is configured to amplify the output reference voltage 140 to generate the supply voltage 150. Referring now to FIG. 2B, the amplifier 145 includes an operational amplifier 215 (e.g. an opamp 215) having a first input coupled to the ADC 130, a second input, and an output. In some embodiments, the amplifier 145 includes the opamp 215 configured in feedback. In some embodiments, the amplifier 145 includes a transistor and a resistive load. The amplifier 145 includes a resistive element 220, with a resistance R3, coupled to the second input of the opamp 215 and the output of the opamp 215. The amplifier 145 includes a resistive element 225, with a resistance R4, coupled to the second input of the opamp 215 and the ground 115. The relationship between the output reference voltage 140, V3, and the supply voltage 150, V4 is:

$$V_4 = V_3 * \frac{R_3 + R_4}{R_4}$$

The input circuit 100A includes a divider 155 coupled to the amplifier 145. The divider 155 is referred to herein as "a supply divider 155." The supply divider 155 is configured to divide-down the supply voltage 150 to the input reference voltage 135. The supply divider 155 can be an instance of the input divider 120 except that the resistive element 205 is coupled to the amplifier 145 and the ref in port of the ADC 130 and the resistive element 210 is coupled to the ref in port of the ADC 130 and the ground 115. The resistive element 205 of the supply divider 155 has a resistance R5 and the resistive element 210 of the supply divider 155 has a resistance R6. In some embodiments, the ratio of R5 and R6 is same as the ratio of R1 and R2. In some embodiments, R5 is same as R1 and R6 is same as R2.

Figure 2C:
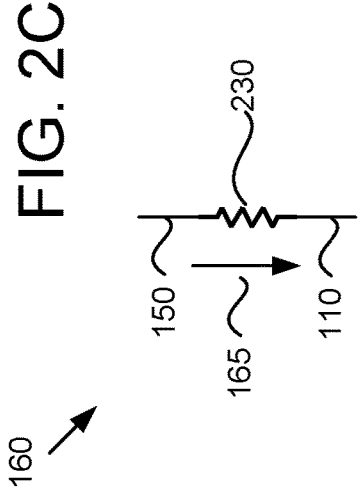
FIG. 2C is an example block diagram of a voltage-controlled current source, according to an exemplary embodiment.

Referring back to FIG. 1A, the input circuit 100A includes a voltage-controlled current source 160 coupled to the supply divider 155. The voltage-controlled current source 160 is configured to convert the supply voltage 150 at a first terminal of the current source 160 to a first current 165 flowing out of a second terminal of the current source 160. In some embodiments, the relationship between the supply voltage 150 and the first current 165 is linear. Referring now to FIG. 2C, the voltage-controlled current source 160 includes a resistive element 230. The resistive element 230 has a resistance R7. The first current 165 is equal to a ratio of the supply voltage 150 and R7. In some embodiments, the first current 165 flows to the input port.

The input circuit 100A includes a microprocessor 170 coupled to the ADC 130. The microprocessor 170 is configured to determine a signal associated with the DUT based on the first digital signal, the second digital signal, and the supply voltage 150. The microprocessor 170 receives the first digital signal and the second digital signal. The microprocessor 170 calculates a first ratio of the second digital signal and the supply voltage 150. The first ratio is a gain of the supply divider 155 and the ADC 130. In some embodiments, the microprocessor 170 periodically calculates the first ratio at a predetermined interval. For example, the microprocessor 170 may calculate the first ratio once per hour or once per minute. The microprocessor 170 calculates a second ratio of the first digital signal and the first ratio. The second ratio is equivalent to the input voltage signal 110. The microprocessor determines the signal associated with the DUT based on the input voltage signal 110. In some embodiments, the microprocessor 170 determines the signal associated with the DUT by calculating a third ratio, which is described below.

The microprocessor 170 may be configured to execute instructions. The instructions may be carried out by a special purpose computer, logic circuits, or hardware circuits of a host machine that the microprocessor 170 is running on. The microprocessor 170 may be implemented in hardware, firmware, software, or any combination thereof. The term "execution" is, for example, the process of running an application or the carrying out of the operation called for by an instruction. The instructions may be written using one or more programming language, scripting language, or assembly language, among others. The microprocessor 170, thus, execute an instruction, meaning that they perform the operations called for by that instruction.

Figure 1B:
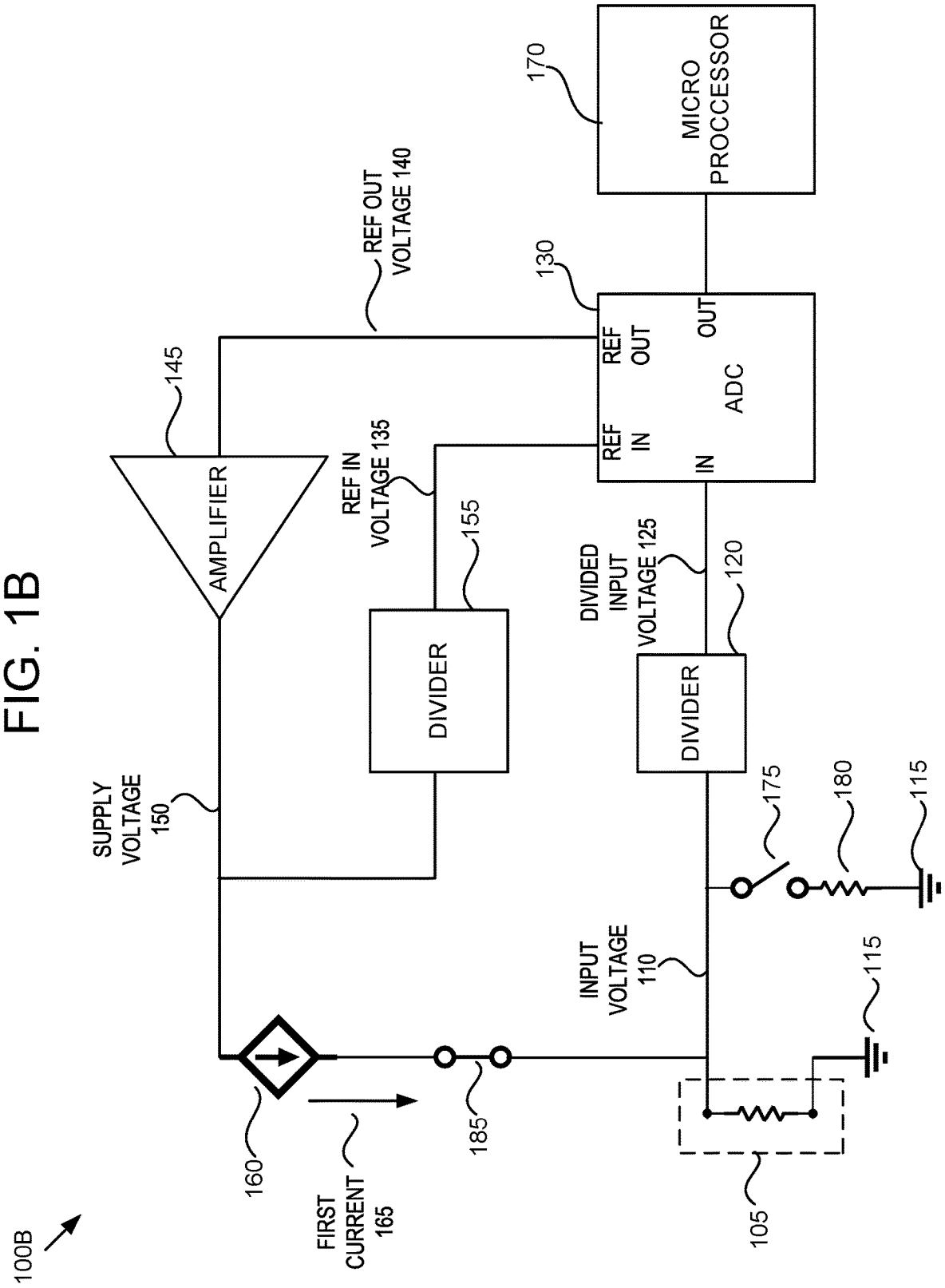
FIG. 1B is an example block diagram of a reconfigurable input circuit, according to an exemplary embodiment.

Now referring to FIG. 1B an example block diagram of a reconfigurable input circuit 100B is shown. Additional, fewer, or different components may be included in the reconfigurable input circuit 100B, depending on the embodiment. In some embodiments, the reconfigurable input circuit 100B is same as the input circuit 100A with respect to FIG. 1A, except for the differences described herein.

The reconfigurable input circuit 100B includes a switch 175 coupled to the input port 105 and a resistive element 180 coupled to the switch 175. The switch 175 has an open position and a closed position. When in the closed position, the switch 175 couples the input port 105 to the resistive element 180. When in the open position, the switch 175 electrically isolates the input port 105 from the resistive element 180. The resistive element 180 is coupled to the ground 115.

The reconfigurable input circuit 100B includes a switch 185 coupled to the input port 105 and the voltage-controlled current source 160. In some embodiments, the input port 105 is not directly coupled to the voltage-controlled current source 160. The switch 185 has an open position and a closed position. When in the closed position, the switch 185 couples the input port 105 to the voltage-controlled current source 160. When in the open position, the switch 175 electrically isolates the input port 105 from voltage-controlled current source 160.

The microprocessor 170 is configured to set the switch 175 to either the open position or the closed position. The microprocessor 170 is configured to set the switch 185 to either the open position or the closed position. For example, the switches 175 and 185 can be three-terminal switches. The third terminal can be a control terminal for setting the corresponding switch to the open position or the closed position. For each switch, the microprocessor 170 can send a signal or an instruction that is converted to a voltage that drives the third terminal of the switch.

In some embodiments, the microprocessor 170 sets the switch positions based on determining what mode the input circuit 100B is in. In a first mode, the input circuit 100B is sensing a resistance (e.g. of the DUT) at the input port 105. In a second mode, the input circuit 100B is sensing a current at the input port 105. In a third mode, the input circuit 100B is sensing a voltage at the input port 105. In some embodiments, the microprocessor 170 determines the mode by receiving an instruction from a user interface.

In the embodiment of FIG. 1B, the microprocessor 170 determines that the input circuit 100B is sensing the DUT resistance. In the embodiment of FIG. 1B, the microprocessor 170 sets the switch 175 to the open position and the switch 185 to the closed position. As a result, the first current 165 flows through the DUT at the input port 105 and generates, based on Ohm's law, the input voltage signal 110 at the input port 105. In some embodiments, setting the switch 175 to the open position and the switch 185 to the closed position is responsive to the microprocessor 170 determining that the input circuit 100B is sensing the DUT resistance.

In the embodiment of FIG. 1B, once the microprocessor 170 determines the input voltage signal 110, the microprocessor 170 is configured to determine the DUT resistance. The microprocessor 170 determines the DUT resistance as a ratio of the second ratio described with respect to FIG. 1A and the first current 165.

Now referring to FIG. 1C an example block diagram of a reconfigurable input circuit 100C is shown. Additional, fewer, or different components may be included in the reconfigurable input circuit 100C, depending on the embodiment. In some embodiments, the reconfigurable input circuit 100C is same as the reconfigurable input circuit 100B with respect to FIG. 1B, except for the differences described herein.

In the embodiment of FIG. 1C, the microprocessor 170 determines that the input circuit 100C is sensing the DUT current. In the embodiment of FIG. 1C, the microprocessor 170 sets the switch 175 to the closed position and the switch 185 to the open position. As a result, the DUT current flows out of the input port 105 and through the resistive element 180 and generates, based on Ohm's law, the input voltage signal 110 at the input port 105. In some embodiments, setting the switch 175 to the closed position and the switch 185 to the open position is responsive to the microprocessor 170 determining that the input circuit 100C is sensing the DUT current.

In the embodiment of FIG. 1C, once the microprocessor 170 determines the input voltage signal 110, the microprocessor 170 is configured to determine the DUT current. The microprocessor 170 determines the DUT current as a ratio of the second ratio described with respect to FIG. 1A and the resistance of the resistive element 180 loading the input port 105.

Now referring to FIG. 1D an example block diagram of a reconfigurable input circuit 100D is shown. Additional, fewer, or different components may be included in the reconfigurable input circuit 100D, depending on the embodiment. In some embodiments, the reconfigurable input circuit 100D is same as the reconfigurable input circuit 100B with respect to FIG. 1B, except for the differences described herein.

In the embodiment of FIG. 1D, the microprocessor 170 determines that the input circuit 100D is sensing the DUT voltage. In the embodiment of FIG. 1D, the microprocessor 170 sets the switch 175 to the open position and the switch 185 to the open position. In some embodiments, setting the switch 175 to the open position and the switch 185 to the open position is responsive to the microprocessor 170 determining that the input circuit 100D is sensing the DUT voltage. In the embodiment of FIG. 1D, once the microprocessor 170 determines the input voltage signal 110, the microprocessor 170 is configured to determine the DUT voltage. The microprocessor 170 determines that the DUT voltage is same as the input voltage signal 110.

A resistive element as described herein (e.g. the resistive elements 180, 205, 210, 220, 225, and 230), is a device that has a predetermined resistance between a first terminal and a second terminal. The resistive element may include one or more resistors, one or more transistors, one or more programmable resistors, or one or more programmable transistors, among others.

A switch as described herein (e.g. the switches 115, 175, and 185), is a device whose conductivity between the first and the second terminals is affected by a signal level of a control signal applied at the third terminal. In some embodiments, in response to the control signal having a signal level above a pre-defined threshold, the first and the second terminals of the switch conductively couple to each other. In response to the control signal having a signal level below a second pre-defined threshold, the first and the second terminals of the switch may be isolated from each other (i.e. they are not conductively coupling to each other). In some embodiments, in response to the control signal having the signal level above the pre-defined threshold, the first and the second terminals of the switch are isolated from each other. In response to the control signal having the signal level below the second pre-defined threshold, the first and the second terminals of the switch may be conductively coupled to each other. A switch that is said to be conductively coupling between its first and second terminal is herein referred to as being "on" or being in a "closed position." A switch that is said to be isolated between its first and second terminal is herein referred to as being "off" or in an "open position." The switch may be an IC switch, a three-terminal transistor, a micro-electro-mechanical system (MEMS), a single-pole, single-throw (SPST) switch, or a single-pole, double-throw (SPDT) switch, among others. Although switches with three terminals are described herein, a number of terminals of the switches can be more or less than three without departing from the scope of the present disclosure.

A transistor as described herein is a device whose conductivity between the first and the second terminals is affected by a signal level of a bias signal applied at the third terminal. The transistor can be biased to behave as a switch (e.g. biased in linear region and has a signal gain less than one). The transistor can be biased to behave as an amplifier (e.g. biased in saturation region and has a signal gain greater than one). The transistor can include a MOS field effect transistors (MOSFET), an n-channel MOSFET (NMOS), a p-channel MOSFET (PMOS), a complementary MOSFET (CMOS), a metal-semiconductor FET (MESFET), a junction gate FET (JFET), a bipolar junction transistor (BJT), an n-type p-type n-type (NPN) BJT, or a p-type n-type p-type (PNP) BJT, among others.

FIG. 3 is a flow chart of a process 300 for sensing HVACR equipment, according to an exemplary embodiment. Additional, fewer, or different operations may be performed in the process 300 depending on the embodiment. The process 300 may be implemented using, or performed by, the microprocessor 170 detailed herein with respect to FIGS. 2A-2D.

A microprocessor, such as the microprocessor 170, receives a first digital signal (302). In some embodiments, the first digital signal is converted from a voltage-divided representation of a supply voltage. The microprocessor calculates a gain based on the first digital signal (304). In some embodiments, the gain is a first ratio of the first digital signal and the supply voltage. In some embodiments, the microprocessor periodically calculates the gain at a predetermined interval.

The microprocessor receives a second digital signal based on an input voltage signal (306). In some embodiments, the second digital signal is converted from a voltage-divided representation of an input voltage signal corresponding to a device-under-test (DUT) coupled to an input port. The microprocessor determines the input voltage signal based on the second digital signal and the gain (308). In some embodiments, the microprocessor determines the input voltage signal by calculating a second ratio of the second digital signal and the gain.

The microprocessor sets each of one or more switches to an open position or a closed position (310). In some embodiments, the microprocessor sets a first switch coupled to the input port and a resistive load to an open position or a closed position. In some embodiments, the microprocessor sets a second switch coupled to the input port and a voltage-controlled current source to an open position or a closed position. In some embodiments, sets each of one or more switches to an open position or a closed position responsive to the microprocessor determining a mode for sensing the DUT. The modes include resistance mode, current mode, and voltage mode.

The microprocessor determines a signal associated with the DUT based on the input voltage signal (312). In some embodiments, the microprocessor determines the signal associated with the DUT in accordance with the mode that is determined by the microprocessor. For example, in the resistance mode, the microprocessor determines the resistance of the DUT by calculating a third ratio of the input voltage signal and a first current of the voltage-controlled current source. In the current mode, the microprocessor can determine the current of the DUT by calculating a third ratio of the input voltage signal and a resistance of the resistive load. In the voltage mode, the microprocessor can determine the voltage of the DUT to be same as the input voltage signal.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A circuit for sensing heating, ventilation, air conditioning, and refrigeration (HVACR) equipment, the circuit comprising:
   an input port that, upon receiving a device-under-test (DUT), has an input voltage signal;
   a first switch coupled to the input port and a resistive load having a load resistance and having a first open position and a first closed position;
   an input divider coupled to the input port and dividing the input voltage signal;
   an analog-to-digital converter (ADC) coupled to the input divider, generating a first digital signal based on receiving an input voltage reference, generating a second digital signal based on receiving the divided input voltage signal, and outputting the first digital signal, the second digital signal, and an output voltage reference;
   an amplifier coupled to the ADC and amplifying the output voltage reference to generate a supply voltage;
   a supply divider coupled to the amplifier and dividing the supply voltage to generate the input voltage reference;
   a voltage-controlled current source coupled to the amplifier and converting the supply voltage to a first current configured to drive the input port;
   a second switch coupled to the voltage-controlled current source and the input port and having a second open position and a second closed position; and
   a microprocessor coupled to the ADC and configured to:
      calculate a first ratio of the first digital signal and the supply voltage; and
      determine the input voltage signal by calculating a second ratio of the second digital signal and the first ratio.

2. The circuit of claim 1, wherein the microprocessor is further configured to:
   set the first switch to the first open position;
   set the second switch to the second closed position; and
   determine a resistance of the DUT by calculating a third ratio of the second ratio and the first current.

3. The circuit of claim 1, wherein the microprocessor is further configured to:
   set the first switch to the first closed position;
   set the second switch in to the second open position; and
   determine a current of the DUT by calculating a third ratio of the second ratio and the load resistance.

4. The circuit of claim 1, wherein the microprocessor is further configured to:
   set the first switch to the first open position;
   set the second switch to the second open position; and
   determine a voltage of the DUT as the input voltage signal.

5. The circuit of claim 1, wherein the microprocessor is further configured to periodically calculate the first ratio at a predetermined interval.

6. The circuit of claim 1, wherein the amplifier comprises:
   an operation amplifier having a first opamp input, a second opamp input and an opamp output;
   a first resistor coupled between the first opamp input and the opamp output; and
   a second resistor between the first opamp input and ground.

7. The circuit of claim 1, wherein the input divider comprises:
   a first resistive element coupled to the input port and the ADC and having a first resistance; and
   a second resistive element coupled to the ADC and ground and having a second resistance.

8. The circuit of claim 7, wherein the supply divider comprises:
   a third resistive element coupled to the amplifier and the ADC and having a third resistance; and
   a fourth resistive element coupled to the ADC and the ground and having a fourth resistance.

9. The circuit of claim 8, wherein a third ratio of the first resistance and the second resistance is same or substantially similar to a fourth ratio of the third resistance and the fourth resistance.

10. The circuit of claim 1, wherein the voltage-controlled current source comprises a first resistive element coupled to the amplifier and the second switch and having a first resistance.

11. A system for sensing heating, ventilation, air conditioning, and refrigeration (HVACR) equipment, the system comprising:
   a controller configured to control HVACR equipment; and
   an circuit coupled to the controller and comprising:
      an input port that, upon receiving a device-under-test (DUT), has an input voltage signal;
      a first switch coupled to the input port and a resistive load having a load resistance and having a first open position and a first closed position;
      an input divider coupled to the input port and dividing the input voltage signal;
      an analog-to-digital converter (ADC) coupled to the input divider, generating a first digital signal based on receiving an input voltage reference, generating a second digital signal based on receiving the divided input voltage signal, and outputting the first digital signal, the second digital signal, and an output voltage reference;
      an amplifier coupled to the ADC and amplifying the output voltage reference to generate a supply voltage;
      a supply divider coupled to the amplifier and dividing the supply voltage to generate the input voltage reference;
      a voltage-controlled current source coupled to the amplifier and converting the supply voltage to a first current configured to drive the input port;
      a second switch coupled to the voltage-controlled current source and the input port and having a second open position and a second closed position; and
      a microprocessor coupled to the ADC and configured to:
         calculate a first ratio of the first digital signal and the supply voltage; and determine the input voltage signal by calculating a second ratio of the second digital signal and the first ratio.

12. The system of claim 11, wherein the microprocessor is further configured to:
set the first switch to the first open position;
set the second switch to the second closed position; and
determine a resistance of the DUT by calculating a third ratio of the second ratio and the first current.

13. The system of claim 11, wherein the microprocessor is further configured to:
set the first switch to the first closed position;
set the second switch in to the second open position; and
determine a current of the DUT by calculating a third ratio of the second ratio and the load resistance.

14. The system of claim 11, wherein the microprocessor is further configured to:
set the first switch to the first open position;
set the second switch to the second open position; and
determine a voltage of the DUT as the input voltage signal.

15. The system of claim 11, wherein the microprocessor is further configured to periodically calculate the first ratio at a predetermined interval.

16. A method for sensing heating, ventilation, air conditioning, and refrigeration (HVACR) equipment, the method comprising:
receiving, by a microprocessor, a first digital signal converted from a first voltage-divided representation of a supply voltage;
calculating, by the microprocessor, a first ratio of the first digital signal and the supply voltage;
receiving, by the microprocessor, a second digital signal converted from a second voltage-divided representation of an input voltage signal corresponding to a device-under-test (DUT) coupled to an input port;
determining, by the microprocessor, the input voltage signal by calculating a second ratio of the second digital signal and the first ratio;
setting, by the microprocessor, a first switch coupled to the input port and a resistive load to a first open position or a first closed position;
setting, by the microprocessor, a second switch coupled to the input port and a voltage-controlled current source to a second open position or a second closed position; and
determining, by the microprocessor, a resistance, a voltage, or a current of the DUT based on the first switch and the second switch.

17. The method of claim 16, further comprising:
setting, by the microprocessor, the first switch to the first open position;
setting, by the microprocessor, the second switch to the second closed position; and
determining, by the microprocessor, the resistance of the DUT by calculating a third ratio of the second ratio and a first current of the voltage-controlled current source.

18. The method of claim 16, further comprising:
setting, by the microprocessor, the first switch to the first closed position;
setting, by the microprocessor, the second switch to the second open position; and
determining, by the microprocessor, the current of the DUT by calculating a third ratio of the second ratio and a load resistance of the resistive load.

19. The method of claim 16, further comprising:
setting, by the microprocessor, the first switch to the first open position;
setting, by the microprocessor, the second switch to the second open position; and
determining, by the microprocessor, the voltage of the DUT as the input voltage signal.

20. The method of claim 16, further comprising periodically calculating, by the microprocessor, the first ratio at a predetermined interval.

* * * * *